United States Patent [19]

Sertich

[11] E Re. 29,687

[45] Reissued Jul. 4, 1978

[54] AIR-VIBRATOR DENTAL SCALER

[76] Inventor: Anthony T. Sertich, 30 Dover Green, Staten Island, New York, N.Y. 10312

[21] Appl. No.: 746,081

[22] Filed: Nov. 30, 1976

Related U.S. Patent Documents

Reissue of:

[64] Patent No.: 3,811,190
Issued: May 21, 1974
Appl. No.: 364,348
Filed: May 29, 1973

[51] Int. Cl.[2] ..... A61C 3/08

[52] U.S. Cl. ..... 32/56; 366/123; 32/DIG. 4; 175/56; 366/125

[58] Field of Search ..... 32/56, 57, 22, 26, 27, 32/DIG. 4; 259/1 R, DIG. 43; 418/65, 137

[56] References Cited

U.S. PATENT DOCUMENTS

| | | | |
|---|---|---|---|
| 2,763,472 | 9/1956 | Fontaine | 259/DIG. 43 |
| 3,082,529 | 3/1963 | Milles et al. | 32/56 |
| 3,368,280 | 2/1968 | Friedman et al. | 32/58 |
| 3,518,766 | 7/1970 | Burt | 32/58 |
| 3,548,501 | 12/1970 | Hoffmeister | 32/27 |
| 3,661,361 | 5/1972 | Malan | 259/DIG. 43 |

*Primary Examiner*—Robert Peshock
*Attorney, Agent, or Firm*—Caesar, Rivise, Bernstein & Cohen, Ltd.

[57] ABSTRACT

In a preferred embodiment of the invention, a dental scaler for the cleaning of teeth in which the scraper is an air-driven vibrator having a scraper mounted on a distal end of a rigid tubular device, with the rigid tubular device being mounted within a resilient support permissive of vibrations of the rigid tubular device and the vibrations of the tubular device being brought about by the exiting of air onto an air-cushioned rotary wheel mounted around the tubular device rotatably, the rotation thereof resulting from the force of the air from preferably a plurality of ports permitting the air to air to exit from the ports against the inner surface of the air rotary wheel, and the rotation of the rotary wheel being about the vibrations which are imparted to the rigid shaft, while the firmly supported tubular shaft within the resilient support structure thereof itself amplifies the magnitude of the vibrations by itself vibrating and transmitting its vibrations back to the rotary wheel, the outlet ports from the tubular device being angled laterally sidewardly in a direction transverse to the longitudinal axis of the tubular device in a preferred embodiment, as well as the ports being angled in an axial direction relative to the longitudinal axis of the tubular device thereby enhancing the optimal flow of air from within the tubular device into the space between the exterior surface of the tubular device and the inner radius surface of the air wheel and preferably also there being similar angular passages between the tubular device and the outlet portions of the air wheel at end-points of the air wheel axially.

35 Claims, 10 Drawing Figures

AIR-VIBRATOR DENTAL SCALER

Matter enclosed in heavy brackets [ ] appears in the original patent but forms no part of this reissue specification; matter printed in italics indicates the additions made by reissue.

Broadly this invention relates to an air-driven tooth scaler and to other utilities of the mechanism thereof.

BACKGROUND TO THE INVENTION

Prior to the present invention, there have been in existence electrically driven scraper vibration means of various structures as well as recently an air driven vibration means for the purpose of a dental scraper.

With the [selenoid] *solenoid* type electrically actuated type scrapers, there have existed undesirable features and disadvantages such as for example the undesirability of using any form of electricity in the vicinity of moisture which could accidentally [braing] *bring* about an electrical shock to a dental patient, as well as the well-known fact that the conventional electrically actuated scrapers currently available are plagued with the problem of cooling necessitating the flow of cooling water therethrough — which flow of water not only complicates the mechanism but additionally further increases the real possibility of accidental shock as parts become worn and/or aged at which time the possibility of short-circuits is increased. Also, by virtue of the necessity of the electrically driven mechanisms and together therewith the cooling thereof with water, the structures are bulky and cumbersome in the handling thereof and additionally are extremely costly in the many parts and cost thereof plus the labor of manufacture being costly and time-consuming, resulting in a high required price to the dentist.

Air driven motors and vibrators heretofore known also have been of a complex nature and bulky, but more importantly have been subject [to rapid] to rapid deterioration and/or wear of the parts thereof, particularly the bearing surfaces — requiring repeated and frequent replacement of such surfaces as well as also being complicated in the manufacture thereof and not nearly so efficient as the electrically actuated mechanisms, for example in the rate and/or magnitude of vibrations attainable.

Also, with the previously electrically actuated as well as the previously air vibrated scrapers, it has not been possible to obtain the desired high level of vibration with the accompanying high scraping efficiency and speed thereof without simultaneously being plagued by the problems and disadvantages noted above.

SUMMARY OF THE INVENTION

Accordingly, it is an object of the present invention to overcome and/or avoid one or more difficulties, problems, and disadvantages of scrapers of the type heretofore available, in the nature of those discussed above.

Another object of the present invention is to obtain a new and generically basic air vibrator having new and desirable advantages as compared to vibrators heretofore available.

Another object is to obtain a new type of washing machine embodying the new basic new air-vibrator mechanism of the present invention.

Another object is to obtain air or other fluid-driven mechanism in which vibrations are amplified therein automatically inherently.

Other objects become apparent from the preceding and following disclosure.

One or more objects of the present invention are obtained by the invention as defined herein.

Broadly the invention includes an elongated tubular element firmly supported by a preferably resilient support and having air or other fluid fed thereinto and having channeling structure for effecting the same, together with outlet ports along the elongated wall(s) of the elongated tube directing the fluid from within the tubular element sidewardly critically angularly at an angle less than perpendicular to the outer side surface of the tubular element and also preferably slanted angularly axially in a direction of the longitudinal axis of the tubular element, with a loosely mounted cylinder having opposite open ends preferably, with the cylinder mounted around the tubular element extending concentrically therethrough, and in a preferred embodiment there being mounted on a distal end of the tubular element a dental scaler blade. In other variation-embodiments of the invention, the vibrator has exceptionally good and effective utility as a dish washer and/or a washing machine for clothes, by virtue of the barely sonic and if desired ultrasonic vibrator mechanism which churns the surrounding water of a water-containing vessel with vigor and high intensity. In such latter washer embodiment, it is possible to further churn the water by having multiple vibrator mechanism instead of merely one, although a single one has proven to exert unbelievable forces on surrounding waters. An additional benefit as a side advantage in such washer utility, is the airing of the clothes and/or dishes or the like being washed, together with the air bubbles further churning the water as well as facilitating the sudsing of the detergent, soap, or the like. The vibrator mechanism may similarly be employed in any other desired utility where high powered vibrations are desirable at low cost and without the necessity of close association of electricity with the water-laden parts or areas of any particular apparatus or the like, such as a laboratory sonicater.

THE FIGURES

Figures 1, 2, 2A, 3, 4A, 4B, 4C:
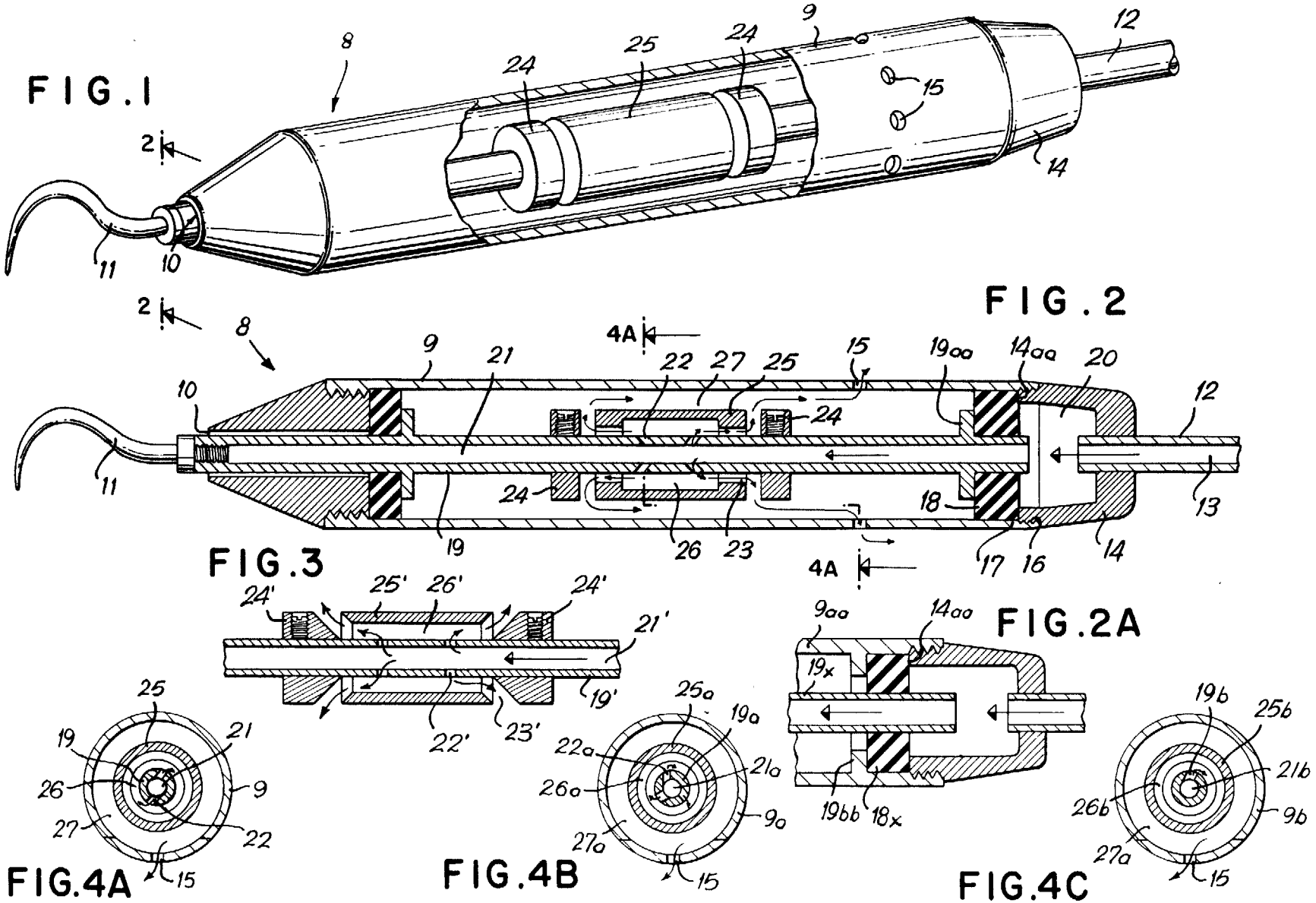
FIG. 1 illustrates a distal end, side and top perspective view of a preferred embodiment of the dental scraper of the present invention.
FIG. 2 illustrates a cross-sectional view as taken along lines 2—2 of FIG. 1, illustrating in side cross-sectional view the inner mechanism of the scraper of FIG. 1.
FIG. 2A illustrates an in-part view in cross-sectional view, illustrating an optional construction consistent with the principle of operation of the present invention.
FIG. 3 illustrates an in-part view in cross-sectional view, illustrating an optional construction of another portion of the mechanism, consistent with the principle of operation of the present invention.
FIG. 4A illustrates a transverse cross-sectional view as taken along line 4A—4A of FIG. 2.
FIG. 4B illustrates an alternative embodiment comparable in its view to that of FIG. 4A.

Likewise, FIG. 4C is an illustration of still another embodiment and is a view comparable to those of FIGS. 4A and 4B.

Figure 5:
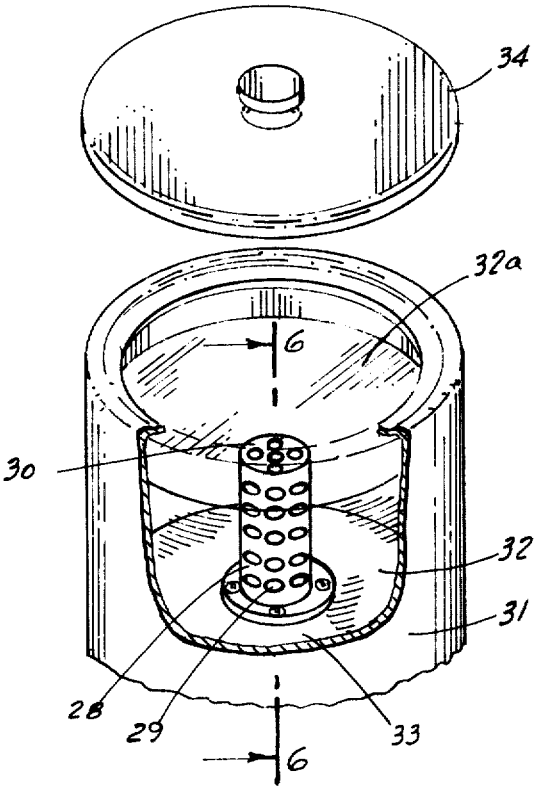

FIG. 5 illustrates in partial cut-away a side-top perspective view in an in-part view of a washing machine embodiment of the mechanism of the present invention, as a vibrator washer.

Figure 6:
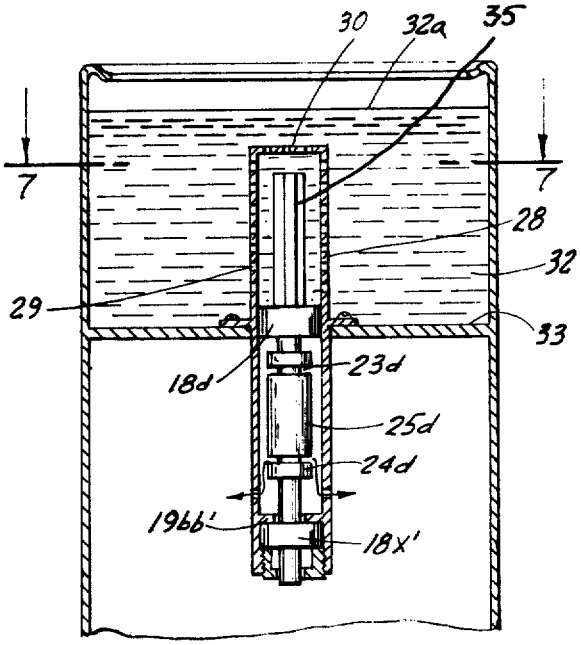

FIG. 6 illustrates a side cross-sectional view as taken along lines 6—6 of FIG. 5, showing the upper washing compartment and the lower vibrator-mechanism compartment, illustrating the vibrator mechanism in side view.

Figure 7:
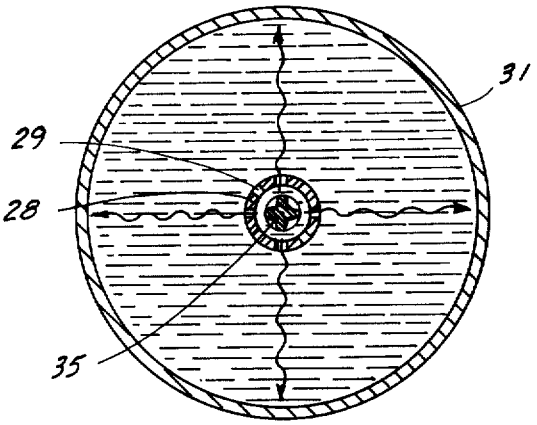

FIG. 7 illustrates a view as taken along lines 7—7 of FIG. 6.

DETAILED DESCRIPTION OF THE INVENTION

Prior to describing in detail the elements and parts of the various Figure illustrations, it is desirable to understand the heart of the mechanism of the present invention.

In the development of the present invention by the inventor, over a period of years many and differing mechanisms and principles were tried and retried as variations thereof in an effort to find an effective scraper of low cost, high efficiency, durability, and convenient in size and handling and operation. Repeatedly there [occured] *occurred* failure. As the design of the present invention began to [develope] *develop*, it was found that the bearing surfaces were totally [unsatisfactary] *unsatisfactory* in durability, the bearings wearing out promptly as the air-driven mechanism spun the cylinder around the tubular central element; moreover, the intensity of vibrations was less than satisfactory. Frustrated by an apparent plurality of insolvable problems, the inventor had removed the bearing surfaces while holding a surrounding support through which the vibrator tube (inner element) was threaded with the support at the proximal end of the vibrator (where the air tube is attached) and accidentally while merely fumbling therewith pulled the vibrating tubular element into a substantially snug and rigid engagement with the proximal circumscribing support of rubber and in doing so was suprised to notice a sudden rise in the tone of the vibrations from a low buzz to a high-pitched squeal, this being indicative of a sudden high-level or rate or frequency of vibrations not heretofore obtained. Upon further experimentation thereafter, it was found that whenever a resilient material exerted a securing pressure onto the tubular element, the tubular element which apparently previously had vibrated in a wide-space cycle became limited to a narrowed-space cycle and in the narrowed cycle served to impart the increase frequency and narrowed range space-wise to the continuing-spinning and driven outer revolving circumscribing cylinder totally free of any bearing surfaces of conventional types, the spinning cylinder picking-up additional frequency from the high-pitched vibrating central tubular element — such that the vibrations initiated by the spinning outer tubular cylinder became highly amplified and that the pitch of sound and corresponding level of frequency increase each in direct proportion to the resilient support pressure exerted onto the inner tubular element. Moreover, it was unexpectedly additionally found that unlike the prior devices, not only were no conventional bearings needed nor required and not only was no cooling liquid or the like required but to the contrary the [folw] *flow* of air served as the bearing-cushion as well as a heat sink effectively cooling the parts to a lower temperature than the temperature thereof prior to beginning the vibrations. [Advantageiously] *Advantageously* thereby it became possible to eliminate both [colling] *cooling* liquids heretofore necessary with electrically actuated scrapers, and to eliminate the problem of bearings and [maintainance] *maintenance* thereof necessary with other prior scrapers. Thereafter, the efficiency of the novel scraper and mechanism thereof was further perfected by the streamlining of the flow passages, employing preferably slanted passages axially as well as slanted exit passages at points between the inner tube and the outer revolving tube, such serving to enhance the easy flow of air and the latter exit passages at the end of the outer revolving tube serving possibly also to increase the pressure of the air against the revolving cylinder because of the change of direction to radially outwardly but angularly to obtain a greater efficiency out of the air in further increasing the revolving speed of the revolutions of the revolving outer cylinder.

In further experimentation, after achieving control of the frequency and being possible even to attain ultrasonic vibration rates if desired, the inventor with the inner tube at a high peak level of vibrations inserted the vibrating inner tube element's distal free end into surface waters of a vessel of water and was suprised to have the water thrown from floor level onto the house ceiling, this exemplifying the intensity and magnitude of force of the vibrations against the water and accordingly the ability of the novel vibrator to churn water within a vessel such as a dish washer and/or a clothes washer, or other situation where intense vibrating and/or circulating forces are desirable or utilizable.

Upon incorporation of the further developed mechanism, the inventor has achieved a small and handy, safe scraper utilizable with the dentists' normal air-tube for other instruments by merely disconnecting another instrument and connecting-in the present tooth-cleaning scraper, without heat nor electrical nor bearing nor additional driving apparatus problems which plague other type scrapers, as noted above.

In greater detail, FIGS. 1 through 4C illustrate a preferred dental tooth scraper and variations thereof, showing in FIG. 1 a scraper device 8 having a casing 9 with a distal-end central axially aligned opening 10 through which a distal end of the inner tubular element 19 extends with the scraper 11 mounted therein or thereon. Air supply tube 12 having passage 13 is joined to air-receptacle 14 of which forward wall 14aa of FIG. 2 is forcibly pressed against resilient rubber member 18 by virtue of the male threads 16 of member 14 being screwed tightly axially into female threads 17 of casing 9, pinning the rubber element 18 between the surface 14aa and the flange 19aa of inner tubular element 19; note that it is believed that the amplifying action results from or is at least enhanced by the radially inwardly directed pressure on the tubular cylinder 19, for example the forcible compressing of the member 14aa causing it to expand in also a radially outwardly and radially direction — or a tendency to thus-expand whereby the axial pinning pressure is converted into radially inwardly directed supporting pressure onto the tubular element 19, and as the member 14 is [screw-in] *screwed-in* more tightly and firmly, the tone of the vibrations and frequency thereof increase proportionately. Air apertures 15 typically provide outlets for the air after it has proceeded from the inlet space 20 through the tubular space 21 through the slanted holes 22 into space 26 and forcibly against the inner surface of the outer cylindrical element 25 to thereby revolve the element 25, the air then exiting through space 23 between the end-portion of element 25 and the guide portion or element 24 into space 27 from which the air then proceeds through outlet air apertures 15. Note that it is critical for each embodiment of the present invention, that holes 22 be angularly slanted as shown in each of FIGS. 4A, 4B, and 4C as holes 22, 22a and 22b in order that the impelling air will strike the annular inner surface of outer cylinder [15] *25* at an angle to give required spinning torque thereto. Intentionally omitted, it is totally impossible for the holes to be about totally radially outwardly extending without slant or for the inner surface of the member 25 to have consecutive wedge surfaces such that a spinning torque is realized. Also, even without [wedge] wedge surfaces on the inner surface of cylinder 25, and with the air hitting it perpendicularly, once a spinning motion were imparted to the outer rotatable cylinder 25 to thereby initiate the revolving flow of the air, the cylinder 25 would by inertia and channeled air be thereafter continued in its rotation or spinning if the air pressure continued. However, the optimum preferred embodiment is disclosed in FIGS. 1, 2, 2A, and 4A.

In the FIG. 2A, there is illustrated an optional mechanism of compressing the element 18x between face [14bb] *14aa* and flange 19bb of casing 9aa such that the radially inwardly expanding rubber element 18x is compacted against and around the inner tubular element 19x.

It is possible that the embodiment 4B with three holes therearound at spaced intervals axially as shown in FIG. 2, would be more efficient and forcible in its driving torque(s) that a mere two-holed embodiment as FIG. 4A or a single-holed embodiment (not illustrated — which would also with only one hole not produce an evenly distributed revolving force), the two or three or more holes around the curved surface serving to — by preferably even spacing — make for smooth operation at a high efficiency. There may be more than one or two rows axially of the tube of such holes, but the number of holes must be kept below an ascertainable permissive flow which would defeat the spinning-action torque by too much air being release uncontrollably and/or by placing too much air pressure within the space 26 serving to lessen the effective spinning-torque(s).

Note that corresponding numbers define corresponding parts.

With reference to FIGS. 5 through 7, there is seen a washing machine vessel 31 having an inner floor [32a] *33* with there mounted thereon a protector cage 28 with apertures 29 and top portion 30, containing in the vessel wash water 32, and the lid 34. The agitator 35 in cross-section is typically "plus"-shaped or X-shaped in order to provide flange surfaces thereby which upon vibration agitate efficiently the water [32a] *32, having a top surface 32a.* Other parts of the vibrator mechanism correspond to those previously discussed above.

It is within the scope and spirit of the present invention to make such variations and modifications as would be apparent to a person of ordinary skill in this art, including substitution of equivalents in function. For example, the cylinder 25 optionally may be devoid of the inwardly extending flange walls such that the inner cylinder walls are straight all-the-way through as shown for cylinder 25, but with the squared-off (non-angular) passage as in FIG. 1, rather than the angular end walls of FIG. [2] *3.*

Finally, it should be noted that the male threads on the shaft of the scaler and the mating female threads in the opening 10 of the tube 19 must be pre-coordinated with the predetermined-direction of spin of the cylinder 25 as determined by which lateral direction (FIGS. 4A, 4B, 4C) the apertures are angularly slanted, since in one direction the male-threaded shaft tends to become more-tightly screwed-into the female threads of hole 10, whereas in a reverse-threaded direction (for the same unchanged direction of spin of cylinder 25) the shaft 11 becomes rapidly unscrewed by the vibrations; the same [phenominon] *phenomenon* is conventionally known to be true with auto-wheel mountings, rotary-lawn mower blades and the like.

I claim:

1. A vibrator device comprising in combination: support means; rigid tubular means supported by [the] *said* support means, said tubular means including structure defining an inlet port and spaced from the inlet port [defining] at least one outlet port, [the] *each said* outlet port being defined in a side wall of [the] *said* tubular means *and being slanted angularly relative to the outer surface of said tubular means such that an imaginary, straightline extension of the axis of each outlet port is offset from the longitudinal axis of said tubular means*; a rotatable wheel means drivable by a fluid media, said rotatable wheel means being operatively mounted [around said tubular means] for rotation [therearound] *around said tubular means,* [each] said [outlet port] *rotatable wheel means* being located relative to [the rotatable wheel means] *each said outlet port* such that the fluid *exiting* from *each* said outlet port serves to propel the wheel rotatably[.], *said inlet port being defined as an end-opening to the said tubular means, and said rotatable wheel means has an inner diameter larger than an outer diameter of said tubular means, said rotatable wheel means being mounted for operative rotation such that fluid from each said outlet port travels through the spacing between the inner surface of said rotatable wheel means and an outer surface of said tubular means and serves as a fluid-bearing cushion, said tubular means and said rotatable wheel means being of configuration such that the space therebetween during rotation of said rotatable wheel is filled solely by the propelling fluid.*

2. [A] *The* vibrator device of claim 1, in which *each* said outlet port [includes tubular structure defining a passage from within the tubular means to space communicating with the outlet port outside of the tubular means with the passage being] *is* slanted angularly relative to the outer surface of the tubular means in a direction substantially transverse to the longitudinal axis of [the] *said* tubular means.

3. [A vibrator] *Vibrator* device of claim [2] *1*, in which said tubular means includes a plurality of [said] outlet [port with the] *ports, said* plurality of outlet ports *being* spaced from [one-another] *one another* substantially equally around [a] *the* circumference of [the] *said* tubular means.

4. [A] *The* vibrator device of claim 3, in which [the] *said* tubular means is substantially linear and rigid in construction and cylindrical in shape.

5. [A] *The* vibrator device of claim 4, in which [the] *said* support means is of a substantially resilient material.

[6. A vibrator device of claim 5, in which the inlet port is defined as an end-opening to the cylindrical tubular means, and in which said rotatable wheel has an inner diameter larger than an outer diameter of the tubular means and is mounted therearound rotatably operably such that fluid from the outlet ports travels through the spacing between the inner radius of the rotatable wheel and an outer radius surface of the tubular means serving as a fluid-bearing cushion.]

7. [A] *The* vibrator device of claim 1, in which [the] *said*support means is of a substantially resilient material[, in which the inlet port is defined as an end-opening to the cylindrical tubular means, and in which said rotatable wheel has an inner diameter larger than an outer diameter of the tubular means and is mounted therearound rotatably operably such that fluid from the outlet ports travels through the spacing between the inner radius of the rotatable wheel and an outer radius surface of the tubular means serving as a fluid-bearing cushion].

8. A vibrator device of claim [6] *5*, in which [the] *said* outlet ports are each [defined continuous with said passage with the passage being] angled axially.

9. [A] *The* vibrator device of claim 8, in which [the] *said* tubular means has an outer surface and [the rotary] *said rotatable* wheel *means* has an inner surface such to define between the outer surface and [the] inner surface an angular outlet extending angularly radially for the exiting of [fluids] *a fluid* from within the space between [the] *said* tubular means and [the] *said* rotatable wheel *means.*

10. [A] *The* vibrator device of claim 9, in which [the] *said* support means includes proximal and distal portions spaced-apart and supporting spaced-apart integral portions of [the] *said* tubular means, on each of opposite sides axially of [the] *said* outlet ports and of [the] *said* mounting position of [the] *said* rotatable wheel.

11. [A] *The* vibrator device of claim 10, including *scraper means* mounted on a distal end of [the] *said* tubular means. [a scraper means]

12. [A] *The* vibrator device of claim 1, including *scraper means* mounted on [the] *said* tubular means at a point spaced from [the] *said* inlet port. [, a scraper means]

13. [A] *The* vibrator device of claim 10, including a vessel structure with the support means mounted within said vessel structure.

14. A vibrator device of claim 1, including a vessel structure with the support means mounted within said vessel structure.

15. A vibrator device of claim 14, including an agitator of about X-cross section, mounted extending axially from a distal end of tubular means.

16. [A] *The* vibrator device of claim 10, including opposing flanges extending radially from [the] *said* tubular means and [spaced-apart] *spaced apart* from [one-another] *one another* on each of opposite sides of [the] *said* rotatable wheel means such that the axial [movement] *positioning* of [the] *said rotatable* wheel means in each of opposite directions along [the] *said* tubular means is [limited within a predetermined range] *maintained adjacent to said outlet ports, said flanges being separated from the adjacent edges of said rotatable wheel means during rotation thereof so as to permit the propelling fluid to freely exit through the spaces therebetween.*

17. [A] *The* vibrator device of claim 2, including opposing flanges extending radially from [the] *said* tubular means and [spaced-apart] *spaced apart* from [one-another] *one another* on each of opposite sides of [the] *said* rotatable wheel means such that the axial [movement] *positioning* of [the] *said rotatable* wheel means in each of opposite directions along [the] *said* tubular means is [limited within a predetermined range] *maintained adjacent to said outlet port(s), said flanges being separated from the adjacent edges of said rotatable wheel means during rotation thereof so as to permit the propelling fluid to freely exit through the spaces therebetween.*

*18. A vibrator device comprising in combination:* support means;

*rigid tubular means supported at opposed ends thereof by said support means, said tubular means including at least one inlet port and at least one outlet port spaced from said inlet port, each outlet port being defined in a side wall of said tubular means and being slanted angularly relative to the outer surface of said tubular means such that an imaginary, straight-line extension of the axis of each output port is offset from the longitudinal axis of said tubular means;*

*rotatable wheel means drivable by a fluid media and mounted for rotation around said tubular means;*

*said rotatable wheel means being located relative to said outlet port(s) such that fluid flowing therethrough serves to rotatably propel said rotatable wheel means, whereby fluid transmitted through said outlet port(s) rotatably propels said rotatable wheel means, the flowing fluid serves as a fluid-bearing cushion upon which said rotatable wheel means rotates, and the rotation of the rotatable wheel means imparts vibrations to said tubular means;*

*said tubular means and said rotatable wheel means being of such configuration that the space therebetween during rotation of said rotatable wheel means is filled solely by the propelling fluid.*

*19. The vibrator device of claim 18 wherein said rotatable wheel means has an inner surface slightly larger than the outer surface of said tubular means.*

*20. The vibrator device of claim 18 wherein said tubular means is substantially linear in construction and cylindrical in shape, and said rotatable wheel means is cylindrical in shape and has an inner diameter slightly larger than the outer diameter of said tubular means.*

*21. The vibrator device of claim 18 wherein said support means is fabricated from a substantially resilient material.*

*22. The vibrator device of claim 18 further including scraper means mounted on said tubular means, the vibrations imparted to said tubular means being transmitted thereby to said scraper means.*

*23. The vibrator device of claim 18 wherein there are a plurality of outlet ports slanted angularly relative to the outer surface of said tubular means, said plurality of outlet ports being slanted in a direction substantially transverse to the longitudinal axis of said tubular means.*

*24. The vibrator device of claim 18 wherein there are a plurality of outlet ports slanted angularly relative to the outer surface of said tubular means, said plurality of outlet ports also being slanted angularly relative to the longitudinal axis of said tubular means.*

*25. The vibrator device of claim 18 further including a casing having a proximal end and a distal end; said support means being within said casing; said inlet port is defined by one open end of said tubular means adjacent the proximal end of said casing; said rotatable wheel means has an inner surface slightly larger than the outer surface of said tubular means, whereby fluid transmitted to said tubular means via said inlet port flows outwardly through said outlet port(s) and the space between the inner surface of said rotatable wheel means and the outer surface of said tubular means to rotatably propel said rotatable wheel means.*

*26. The vibrator device of claim 25 further including scraper means mounted on said tubular means adjacent the distal end of said casing, the vibrations imparted to said tubular means being transmitted thereby to said scraper means.*

*27. The vibrator device of claim 25 wherein said support means includes spaced-apart portions adjacent the proximal and distal ends of said casing, said portions supporting spaced-apart integral portions of said tubular means on axially opposite sides of said outlet port(s) and the mounting position of said rotatable wheel means, said tubular means including a pair of spaced-apart guide means, one each on opposite sides of the mounting position of said rotatable wheel means, such that axial positioning of said rotatable wheel means along said tubular means is maintained adjacent to said outlet port(s), said guide means being separated from the adjacent edges of said rotatable wheel means during rotation thereof so as to permit the propelling fluid to freely exit through the spaces therebetween.*

*28. A dental scaler comprising in combination:*

*a casing having a proximal end and a distal end;*

*substantially resilient support means within said casing;*

*rigid tubular means supported at the opposed ends thereof by said support means, said tubular means including an inlet port and a plurality of outlet ports spaced from said inlet port, said inlet port being defined by one open end of said tubular means adjacent the proximal end of said casing and each of said outlet ports being defined in a side wall of said tubular means, said outlet ports being slanted angularly relative to the outer surface of said tubular means such that an imaginary, straightline extension of the axis of each outlet port is offset from the longitudinal axis of said tubular means;*

*scraper means mounted on said tubular means adjacent the distal end of said casing;*

*rotatable wheel means drivable by a fluid media and mounted for rotation about said tubular means, said rotatable wheel means having an inner surface slightly larger than the outer surface of said tubular means;*

*said rotatable wheel means being located relative to said outlet ports such that fluid flowing therethrough serves to rotatably propel said rotatable wheel means;*

*said tubular means and said rotatable wheel means being of such configuration that the space therebetween during rotation of said rotatable wheel means is filled solely by the propelling fluid;*

*whereby fluid transmitted to said tubular means via said inlet port flows outwardly through said outlet ports and the space between the inner surface of said rotatable wheel means and the outer surface of said tubular means to thereby rotatably propel said rotatable wheel means, the flowing fluid serves as a fluid-bearing cushion upon which said rotatable wheel means rotates, and the rotation of the rotatable wheel means imparts vibrations to said tubular means which are transmitted to said scraper means.*

*29. The dental scaler of claim 28 wherein said outlet ports are spaced from one another substantially equally around the circumference of said tubular means.*

*30. The dental scaler of claim 28 wherein said outlet ports are slanted angularly in a direction substantially transverse to the longitudinal axis of said tubular means.*

*31. The dental scaler of claim 28 wherein said outlet ports are also slanted angularly relative to the longitudinal axis of said tubular means.*

*32. The dental scaler of claim 28 wherein said tubular means is substantially linear in construction and cylindrical in shape, and said rotatable wheel means is cylindrical in shape.*

*33. The dental scaler of claim 28 wherein said support means includes spaced-apart portions adjacent the proximal and distal ends of said casing, said portions supporting spaced-apart integral portions of said tubular means on axially opposite sides of said outlet ports and of the mounting position of said rotatable wheel means, said tubular means includes a pair of spaced-apart guide means, one each on opposite sides of the mounting position of said rotatable wheel means, such that axial positioning of said rotatable wheel means along said tubular means is maintained adjacent to said outlet ports, said guide means being separated from the adjacent edges of said rotatable wheel means during rotation thereof so as to permit the propelling fluid to freely exit through the spaces therebetween.*

*34. A dental scaler comprising in combination:*

*a casing having a proximal end and a distal end;*

*substantially resilient support means within said casing;*

*rigid tubular means supported at the opposed ends thereof by said support means, said tubular means being substantially linear in construction, cylindrical in shape and including an inlet port and a plurality of outlet ports spaced from said inlet port, said inlet port being defined by one open end of said tubular means adjacent the proximal end of said casing and each of said outlet ports being defined in a side wall of said tubular means, said outlet ports being slanted angularly relative to the outer surface of said tubular means in a direction substantially transverse to the longitudinal axis of said tubular means such that an imaginary, straightline extension of the axis of each outlet port is offset from the longitudinal axis of said tubular means;*

*scraper means mounted on said tubular means adjacent the distal end of said casing;*

*cylindrical rotatable wheel means drivable by a fluid media and mounted for rotation about said tubular means, said rotatable wheel means having an inner diameter slightly larger than the outer diameter of said tubular means;*

*said rotatable wheel means being located relative to said outer ports such that fluid flowing therethrough serves to rotatably propel said rotatable wheel means;*

*said tubular means and said rotatable wheel means being of such configuration that the space therebetween during rotation of said rotatable wheel means is filled solely by the propelling fluid;*

*whereby fluid transmitted to said tubular means via said inlet port flows outwardly through said outlet ports and the space between the inner surface of said rotatable wheel means and the outer surface of said tubular means to thereby rotatably propel said rotatable wheel means, the flowing fluid serves as a fluid-bearing cushion upon which said rotatable wheel means rotates, and the rotation of the rotatable wheel means imparts vibrations to said tubular means which are transmitted to said scraper means.*

*35. The dental scaler of claim 34 wherein those of said outlet ports in the same plane substantially transverse to the longitudinal axis of said tubular means are spaced from one another substantially equally around the circumference of said tubular means.*

*36. The dental scaler of claim 34 wherein said support means includes spaced-apart portions adjacent the proximal and distal ends of said casing, said portions supporting*

*spaced-apart integral portions of said tubular means on axially opposite sides of said outlet ports and of the mounting position of said rotatable wheel means, said tubular means includes a pair of spaced-apart guide means, one each on opposite sides of the mounting position of said rotatable wheel means, such that axial positioning of said rotatable wheel means along said tubular means is maintained adjacent to said outlet ports, said guide means being separated from the adjacent edges of said rotatable wheel means during rotation thereof so as to permit the propelling fluid to freely exit through the spaces therebetween.*

* * * * *

UNITED STATES PATENT AND TRADEMARK OFFICE

CERTIFICATE OF CORRECTION

PATENT NO. : Reissue Patent No. 29,687

DATED : July 4, 1978

INVENTOR(S) : Anthony T. Sertich

It is certified that error appears in the above-identified patent and that said Letters Patent are hereby corrected as shown below:

In the Abstract, Line 11, cancel "to air".

In the Abstract, Line 13, cancel "being" and insert therefor --bringing--.

Claim 3, Line 1, insert --The-- before "Vibrator".

Claim 3, Line 1, cancel "Vibrator" and insert therefor --vibrator--.

Claim 7, Line 2, cancel "saidsupport" and insert therefor --said support--.

Claim 10, Line 7 of Claim, after "wheel" and before the period (.) insert --means--.

Claim 34, line 27 of Claim, (line 45 of Column 10), cancel "outer" and insert therefor --outlet--.

Signed and Sealed this

*Ninth* Day of *January 1979*

[SEAL]

*Attest:*

RUTH C. MASON
*Attesting Officer*

DONALD W. BANNER
*Commissioner of Patents and Trademarks*